United States Patent
Suzuki et al.

(10) Patent No.: US 7,120,146 B2
(45) Date of Patent: Oct. 10, 2006

(54) METHOD AND NETWORK FOR INTERCONNECTING SEPARATE MULTICAST CHANNELS ACQUIRED FOR SEPARATE BUS SYSTEMS

(75) Inventors: Johji Suzuki, Tokyo (JP); Morihisa Momona, Tokyo (JP)

(73) Assignee: NEC Corporation, Tokyo (JP)

( * ) Notice: Subject to any disclaimer, the term of this patent is extended or adjusted under 35 U.S.C. 154(b) by 916 days.

(21) Appl. No.: 09/972,947

(22) Filed: Oct. 10, 2001

(65) Prior Publication Data

US 2002/0041594 A1    Apr. 11, 2002

(30) Foreign Application Priority Data

Oct. 10, 2000    (JP)    ............................. 2000-309813

(51) Int. Cl.
*H04L 12/56*    (2006.01)

(52) U.S. Cl. ...................... 370/390; 370/402; 370/432

(58) Field of Classification Search ..................... None
See application file for complete search history.

(56) References Cited

U.S. PATENT DOCUMENTS 5,825,752 A * 10/1998 Fujimori et al. ............ 370/260
6,230,225 B1 * 5/2001 Olarig et al. ................ 710/306
6,434,117 B1 * 8/2002 Momona ..................... 370/236
6,728,821 B1 * 4/2004 James et al. ................ 710/306
6,738,816 B1 * 5/2004 Momona ..................... 709/226
6,751,221 B1 * 6/2004 Saito et al. .................. 370/392
6,757,743 B1 * 6/2004 Tamori et al. ............... 709/249
6,895,456 B1 * 5/2005 Olarig et al. ................ 710/100
2001/0037422 A1 * 11/2001 Thaler et al. ................ 710/126
2003/0115390 A1 * 6/2003 Iijima ......................... 710/104

* cited by examiner

*Primary Examiner*—Chi Pham
*Assistant Examiner*—Anh-Vu Ly
(74) *Attorney, Agent, or Firm*—Young & Thompson

(57) ABSTRACT

In a communication network where multiple bus systems are interconnected by a bus bridge, a first node attached to a first bus system acquires a first channel for transmission of packets to a first multicast address and broadcasts a first message pertaining to the first channel and the first multicast address. A second node attached to a second bus system acquires a second channel for transmission of packets to a second multicast address and broadcasts a second message pertaining to the second channel and the second multicast address. In response to receipt of the first and second messages, the bus bridge establishes a connection between two channels respectively identified by the received messages if the multicast addresses contained in the received messages are equal to each other.

28 Claims, 14 Drawing Sheets

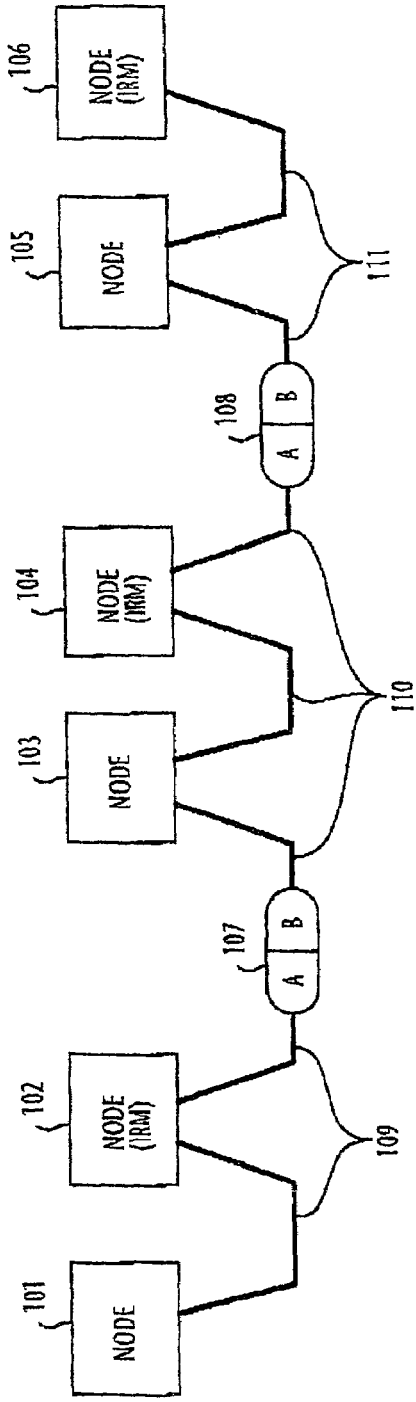
FIG. 1
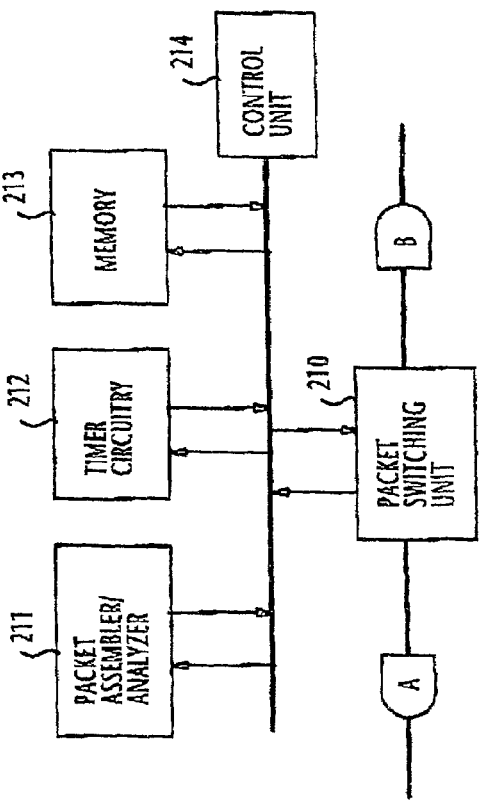
FIG. 3
BUS BRIDGE
FIG. 2

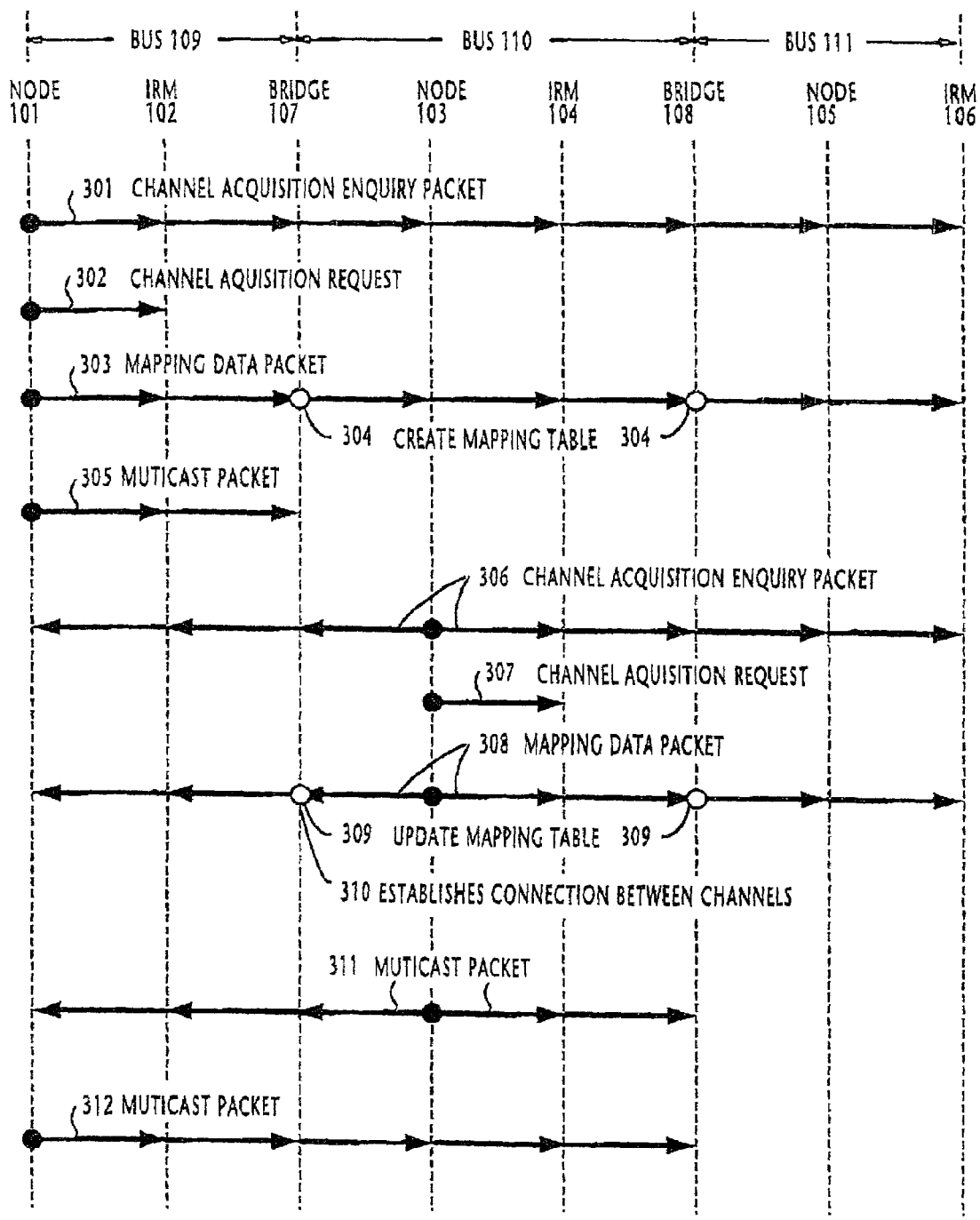

FIG. 5A

CHANNEL ACQUISITION ENQUIRY PACKET

| | | |
|---|---|---|
| 201 | NODE NUMBER | BUS 109 ID + NODE 101 ID |
| 202 | MESSAGE TYPE | ACQUISITION ENQUIRY |
| 203 | CHANNEL NUMBER | — |
| 204 | DESTINATION ADRS | A1 |

FIG. 5B

MAPPING DATA PACKET

| | | |
|---|---|---|
| 201 | NODE NUMBER | BUS 109 ID + NODE 101 ID |
| 202 | MESSAGE TYPE | REPORT FROM TRANSMIT NODE |
| 203 | CHANNEL NUMBER | C1 |
| 204 | DESTINATION ADRS | A1 |

FIG. 5C

MAPPING TABLE OF BRIDGES 107, 108

| PORT A | BUS 109 ID + NODE 101 ID | REPORT FROM TRANSMIT NODE | C1 | A1 |
|---|---|---|---|---|

FIG. 6A
CHANNEL ACQUISITION ENQUIRY PACKET

| 201 NODE NUMBER | BUS 110 ID + NODE 103 ID |
|---|---|
| 202 MESSAGE TYPE | ACQUISITION ENQUIRY |
| 203 CHANNEL NUMBER | — |
| 204 DESTINATION ADRS | A1 |

FIG. 6B
MAPPING DATA PACKET

| 201 NODE NUMBER | BUS 110 ID + NODE 103 ID |
|---|---|
| 202 MESSAGE TYPE | REPORT FROM TRANSMIT NODE |
| 203 CHANNEL NUMBER | C2 |
| 204 DESTINATION ADRS | A1 |

FIG. 6C
MAPPING TABLE OF BRIDGE 107

| PORT A | BUS 109 ID + NODE 101 ID | REPORT FROM TRANSMIT NODE | C1 | A1 |
|---|---|---|---|---|
| PORT B | BUS 110 ID + NODE 103 ID | REPORT FROM TRANSMIT NODE | C2 | A1 |

FIG. 6D
MAPPING TABLE OF BRIDGE 108

| PORT A | BUS 109 ID + NODE 101 ID | REPORT FROM TRANSMIT NODE | C1 | A1 |
|---|---|---|---|---|
| PORT A | BUS 110 ID + NODE 103 ID | REPORT FROM TRANSMIT NODE | C2 | A1 |

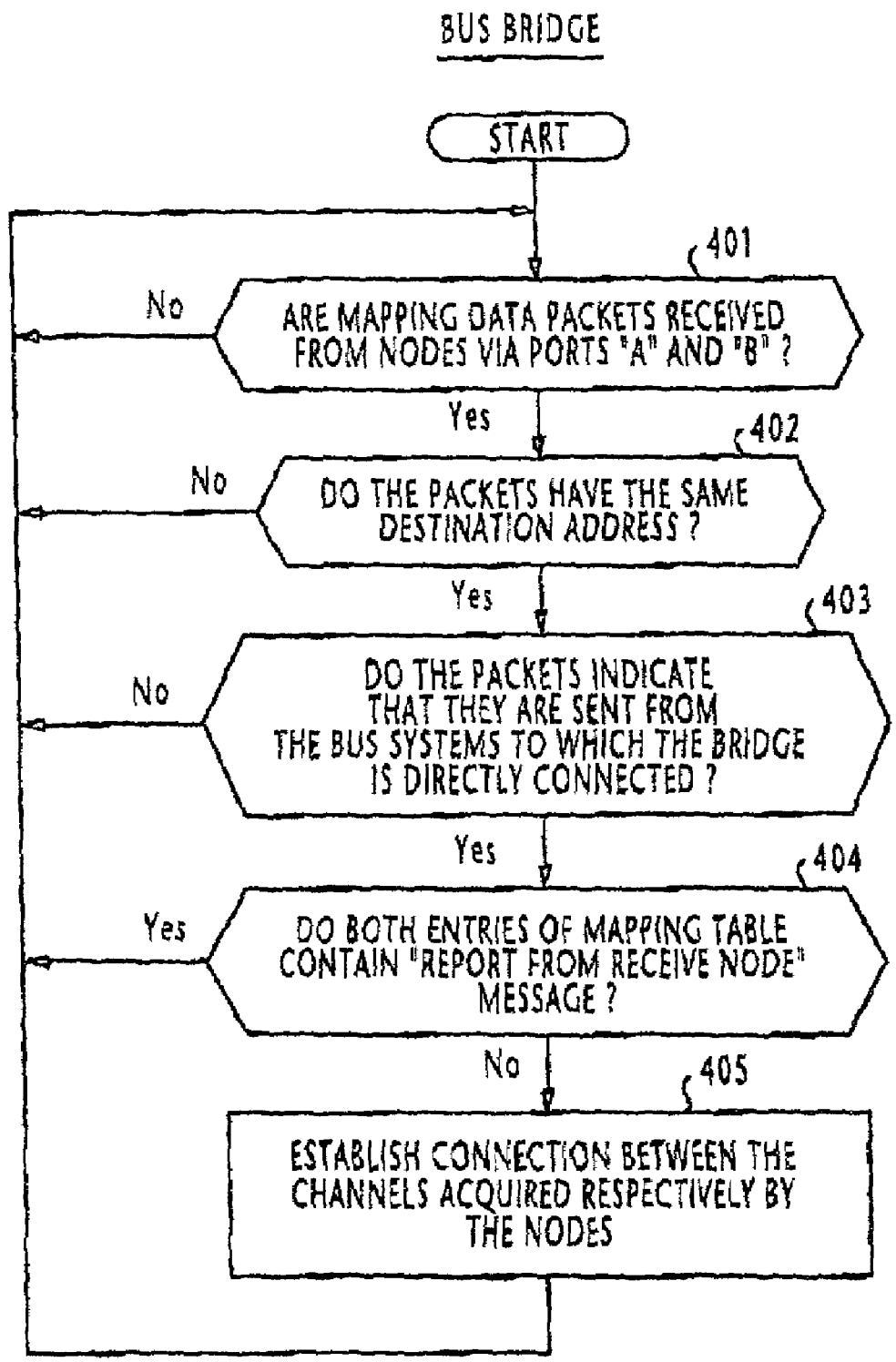

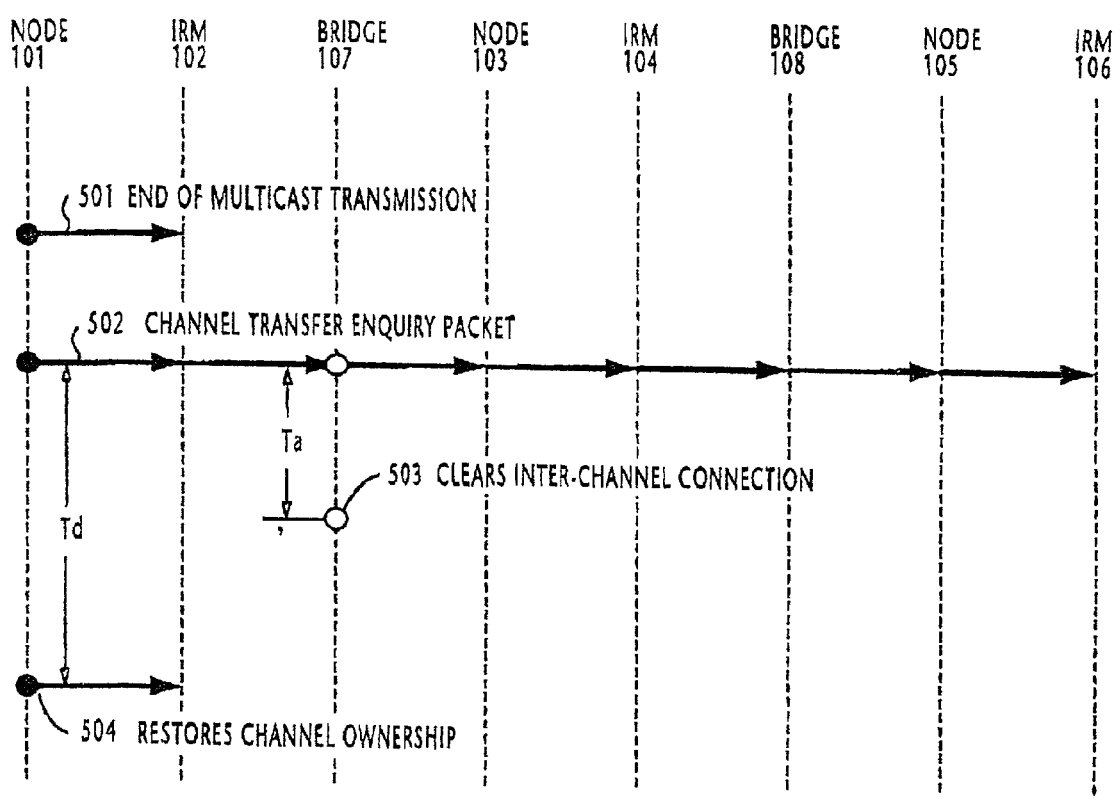

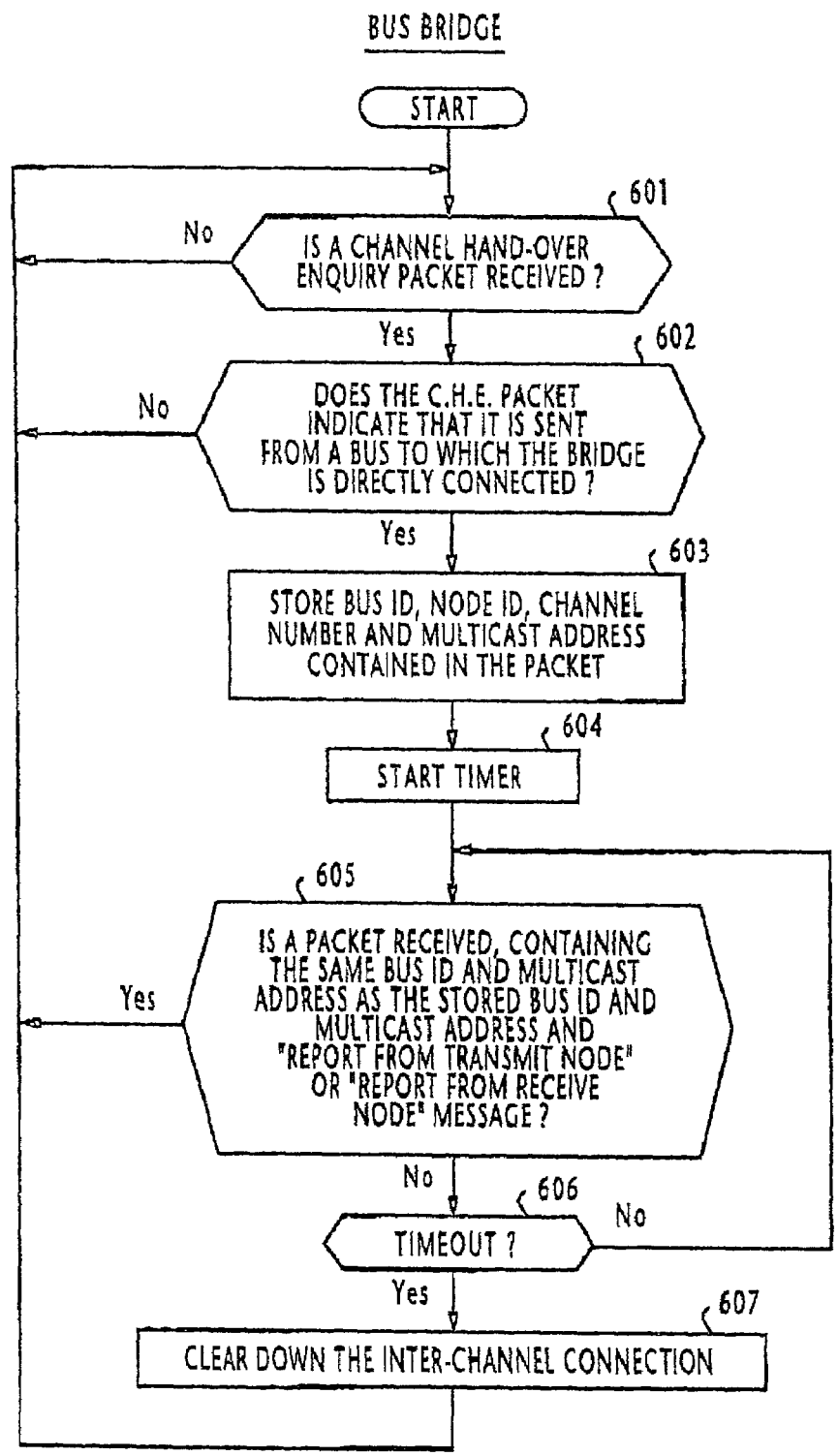

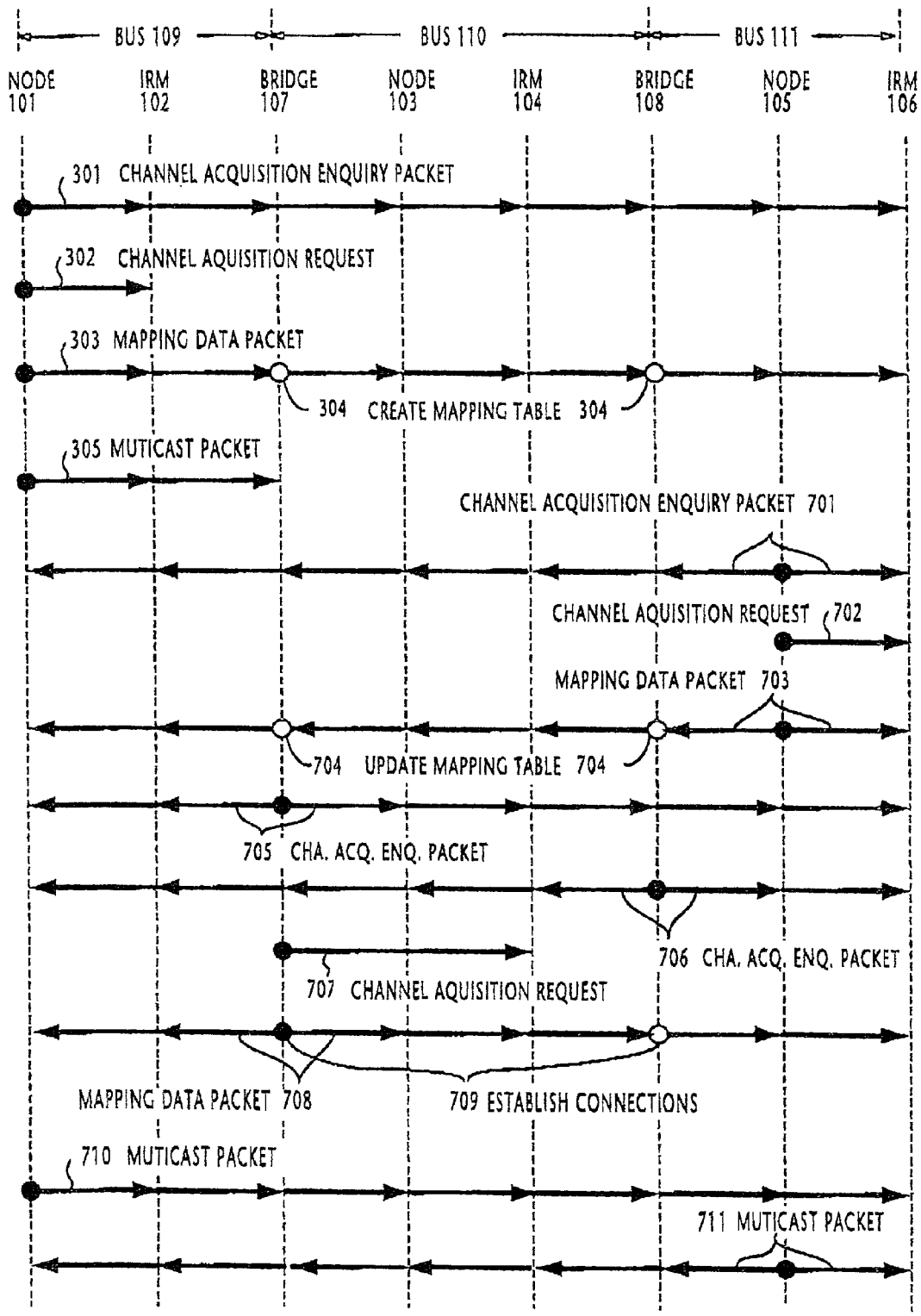
FIG. 10 ESTABLISHMENT OF INTER-CHANNEL CONNECTION

FIG. 11A

MAPPING TABLE OF BRIDGES 107, 108

| PORT A | BUS 109 ID + NODE 101 ID | REPORT FROM TRANSMIT NODE | C1 | A1 |
|---|---|---|---|---|
| PORT B | BUS 111 ID + NODE 105 ID | REPORT FROM TRANSMIT NODE | C3 | A1 |

FIG. 11B

CHANNEL ACQUISITION ENQUIRY PACKET FROM BRIDGE 107

| 201 | NODE NUMBER | BUS 110 ID + BRIDGE 107 ID |
|---|---|---|
| 202 | MESSAGE TYPE | ACQUISITION ENQUIRY |
| 203 | CHANNEL NUMBER | — |
| 204 | DESTINATION ADRS | A1 |

FIG. 11C

CHANNEL ACQUISITION ENQUIRY PACKET FROM BRIDGE 108

| 201 | NODE NUMBER | BUS 110 ID + BRIDGE 108 ID |
|---|---|---|
| 202 | MESSAGE TYPE | ACQUISITION ENQUIRY |
| 203 | CHANNEL NUMBER | — |
| 204 | DESTINATION ADRS | A1 |

FIG. 11D

MAPPING DATA PACKET FROM BRIDGE 107

| 201 | NODE NUMBER | BUS 110 ID + BRIDGE 107 ID |
|---|---|---|
| 202 | MESSAGE TYPE | REPORT FROM RECEIVE NODE |
| 203 | CHANNEL NUMBER | C2 |
| 204 | DESTINATION ADRS | A1 |

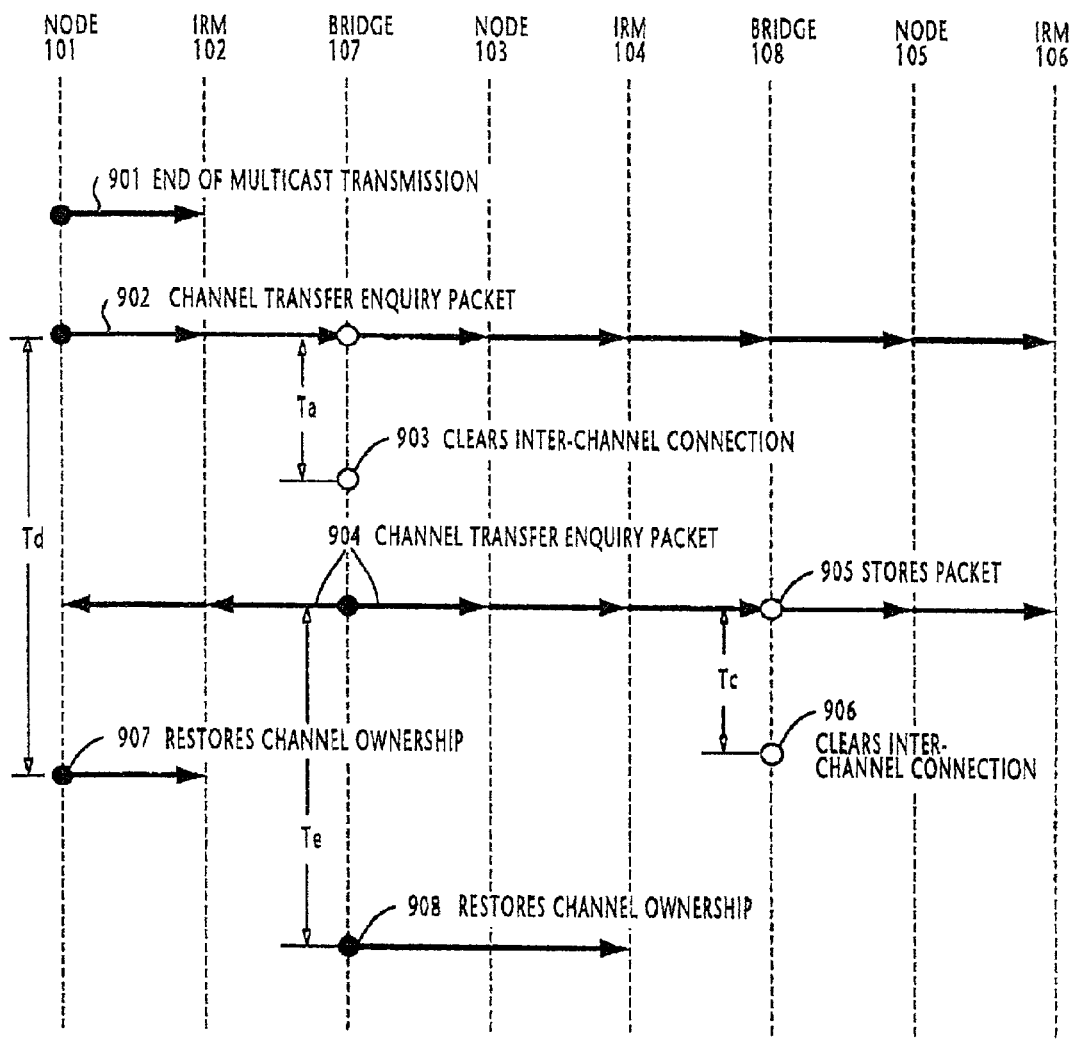

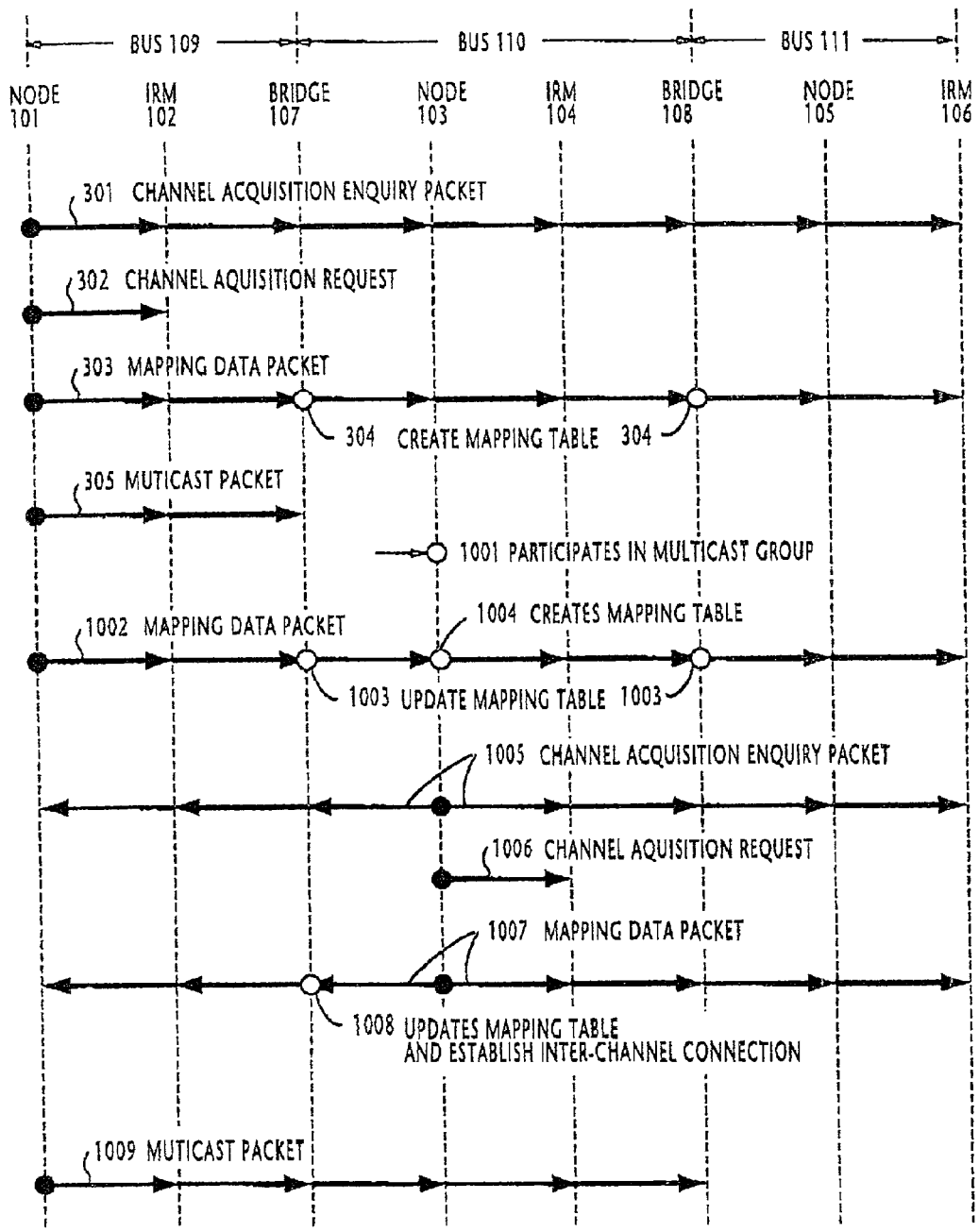

FIG. 15A

MAPPING TABLE OF BRIDGES 107, 108

| PORT A | BUS 109 ID + NODE 101 ID | REPORT FROM TRANSMIT NODE | C1 | A1 |

FIG. 15B

MAPPING TABLE OF BRIDGE 107

| PORT A | BUS 109 ID + NODE 101 ID | REPORT FROM TRANSMIT NODE | C1 | A1 |
| PORT B | BUS 110 ID + NODE 103 ID | REPORT FROM RECEIVE NODE | C2 | A1 |

FIG. 15C

MAPPING TABLE OF BRIDGE 108

| PORT A | BUS 109 ID + NODE 101 ID | REPORT FROM TRANSMIT NODE | C1 | A1 |
| PORT A | BUS 110 ID + NODE 103 ID | REPORT FROM RECEIVE NODE | C2 | A1 |

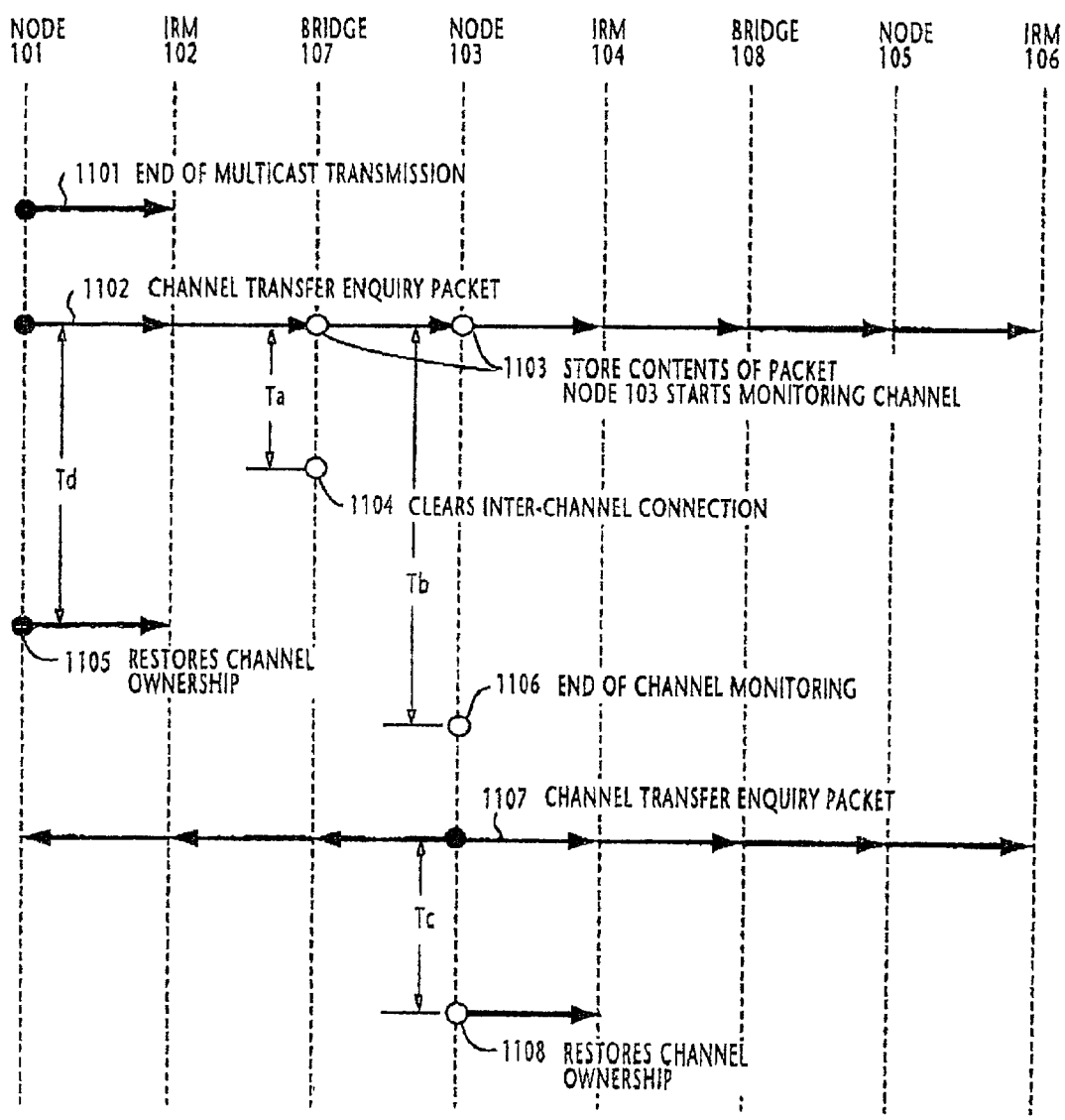

METHOD AND NETWORK FOR INTERCONNECTING SEPARATE MULTICAST CHANNELS ACQUIRED FOR SEPARATE BUS SYSTEMS

BACKGROUND OF THE INVENTION

1. Field of the Invention

The present invention relates generally to serial bus networks, and more specifically to a standardized serial bus network such as IEEE Std 1394-1995 or IEEE Std 1394a-2000 (hereinafter IEEE 1394 standard) in which bus bridges are used to interconnect serial buses and TCP/IP protocol is used for inter-bridge communications.

2. Description of the Related Art

Recent attentions have increasingly been focused on the high speed transport capability of the IEEE 1394 serial bus network to promote multimedia communications. One such effort has culminated in the IP over IEEE 1394 protocol (RFC 2734) developed by the IETF (Internet Engineering Task Force) to support the Internet Protocol. The IP over IEEE 1394 protocol defines a method in which IP packets are transmitted in unicast, multicast and broadcast modes. According to the IP over IEEE 1394 protocol, "asynchronous packets" are used for transmitting unicast messages and "asynchronous stream channels" are used for transmitting multicast and broadcast messages. Multicast channel allocation protocol is also defined for allocating an asynchronous stream channel to a number of nodes attached to a common bus.

The Serial Bus architecture supports multiple bus networks via bus bridges. A bus bridge normally eavesdrops on the bus, ignoring all transactions between local addresses but listening for remote transactions. When the bus bridge receives a packet for a remote address, it forwards the packet to an adjacent bus. After initialization, the bus bridges are transparent to the system. Bus bridges are also used to segment a large system into a number of small bus systems.

However, the multicast channel allocation protocol limits the reachable extent of multicast transmissions to only one bus system. While unicast and broadcast messages can be transmitted between multiple bus system via bus bridges, the bus bridges allow no inter-bridge multicast transmissions.

Therefore, there exists a need to provide bus bridges capable of retransmitting multicast packets from a multicast group of one bus system to a multicast group of another bus system. If a multiple bus network has three or more bus systems, intermediate bus systems must be capable of acquiring an asynchronous stream channel for retransmitting multicast messages from source to destination bus systems. In addition, such intermediate bus systems must also be capable of acquiring an asynchronous stream channel for multicast transmission even if their nodes are all receive-only nodes which are currently not designed to acquire an asynchronous stream channel.

SUMMARY OF THE INVENTION

It is therefore an object of the present invention to provide a packet communication method and network for transmitting multicast packets across bus systems.

According to a first aspect of the present invention, there is provided a packet communication method for a network having a plurality of bus systems interconnected by at least one bus bridge, each of the bus systems including at least one node, wherein the bus systems, the bridge and the node are in compliance to a serial bus standard. The method is characterized in that the bus bridge establishes a connection between a first channel used in a first bus system for transmission of packets to a first multicast address and a second channel used in a second bus system for transmission of packets to a second multicast address if the first and second multicast addresses are equal to each other.

According to a second aspect, the present invention provides a packet communication method for a network having a plurality of bus systems interconnected by at least one bus bridge, each of the bus systems including at least one node, wherein the bus systems, the bridge and the node are in compliance to a serial bus standard. The method is characterized in that at least one node on each of the bus systems, when initiating a multicast packet transmission to a multicast group of the bus system, acquires a channel to be used for the multicast packet transmission and broadcasts a message pertaining to the channel, and the bus bridge establishes a connection between channels acquired for different bus systems when the message is received from each of the different bus systems.

According to a third aspect, the present invention provides a packet communication method for a network having an intermediate bus system connected between first and second bus systems by first and second bus bridges, each of the bus systems including at least one node, wherein the bus systems, the bridge and the node are in compliance to a serial bus standard. The method is characterized in that at least one node on each of the bus systems acquires a channel to be used for multicast packet transmission and broadcasts a message pertaining to the channel and a multicast group when initiating a multicast packet transmission to the multicast group. The first bus bridge acquires an interconnection channel if there is no node in the intermediate bus system participating in the multicast group and if two of the message having an identical multicast: address are received, one from the first bus system and the other from the second bus system, broadcasts a message pertaining to the interconnection channel and the multicast group and connects a first end of the interconnection channel to the channel acquired for the first bus system. The second bus bridge connects a second end of the interconnection channel to the channel acquired for the second bus system when the message is received from the first bus bridge.

According to a fourth aspect of the present invention, there is provided a bus bridge for interconnecting a plurality of bus systems of a packet communication network. Each of the bus systems includes at least one node, wherein the bus systems, the bridge and the node are in compliance to a serial bus standard. The bus bridge establishes a connection between a first channel used in a first bus system of the plurality of bus systems for transmission of packets to a first multicast address and a second channel used in a second bus system of the bus systems for transmission of packets to a second multicast address if the first and second multicast addresses are equal to each other and the first and second channels have different channel identifiers from each other.

BRIEF DESCRIPTION OF THE DRAWINGS

The present invention will be described in detail further with reference to the following drawings, in which:

FIG. 1 is a block diagram of a multi-bus communication network of the present invention;

FIG. 2 shows details of a packet used in the communication network;

FIG. 3 is a block diagram of each bus bridge of the network;

FIG. 4 is a sequence diagram of the operation of a first embodiment of the present invention when inter-channel connection is established;

FIG. 5A shows a channel acquisition enquiry packet sent from a first multicast transmit node;

FIG. 5B shows a mapping data packet sent from the first multicast transmit node;

FIG. 5C shows a mapping table of first and second bus bridges when the mapping data packet of FIG. 5B is received;

FIG. 6A shows a channel acquisition enquiry packet sent from a second multicast transmit node;

FIG. 6B shows a mapping data packet sent from the second multicast transmit node;

FIG. 6C shows a mapping table of the first bus bridge when the mapping data packet of FIG. 6B is received;

FIG. 6D shows a mapping table of the second bus bridge when the mapping data packet of FIG. 6B is received;

FIG. 7 is a flowchart of the operation of each bus bridge when inter-channel connection is established;

FIG. 8 is a sequence diagram of the operation of the first embodiment of the present invention when the inter-channel connection is cleared;

FIG. 9 is a flowchart of the operation of each bus bridge when the inter-channel connection is cleared;

FIG. 10 is a sequence diagram of the operation of a second embodiment of the present invention in which inter-channel connection is established between terminal bus systems via an intermediate bus system;

FIG. 11A shows a mapping table created by first and second bridges when they received channel acquisition enquiry packets respectively from transmit nodes on the terminal bus systems;

FIGS. 11B and 11C show channel acquisition enquiry packets transmitted from the first and second bus bridges respectively after they have created their mapping table of FIG. 11A;

FIG. 11D shows a mapping data packet sent from one of the bus bridges when a channel is acquired;

FIG. 13 is a sequence diagram of the operation of the second embodiment for illustrating the process of clearing the inter-channel connection;

FIG. 14 is a sequence diagram of the operation of a third embodiment of the present invention in which an inter-channel connection is established between a transmit node and a receive-only node;

FIG. 15A shows a mapping table of first and second bus bridges when the transmit node of FIG. 14 broadcasts a mapping data packet after acquiring a channel;

FIGS. 15B and 15C show respective mapping tables of the first and second bridges when the receive-only node broadcasts a mapping data packet after acquiring a channel; and FIG. 16 is a sequence diagram of the operation of the third embodiment for illustrating the process of clearing the inter-channel connection.

DETAILED DESCRIPTION

Figure 12:
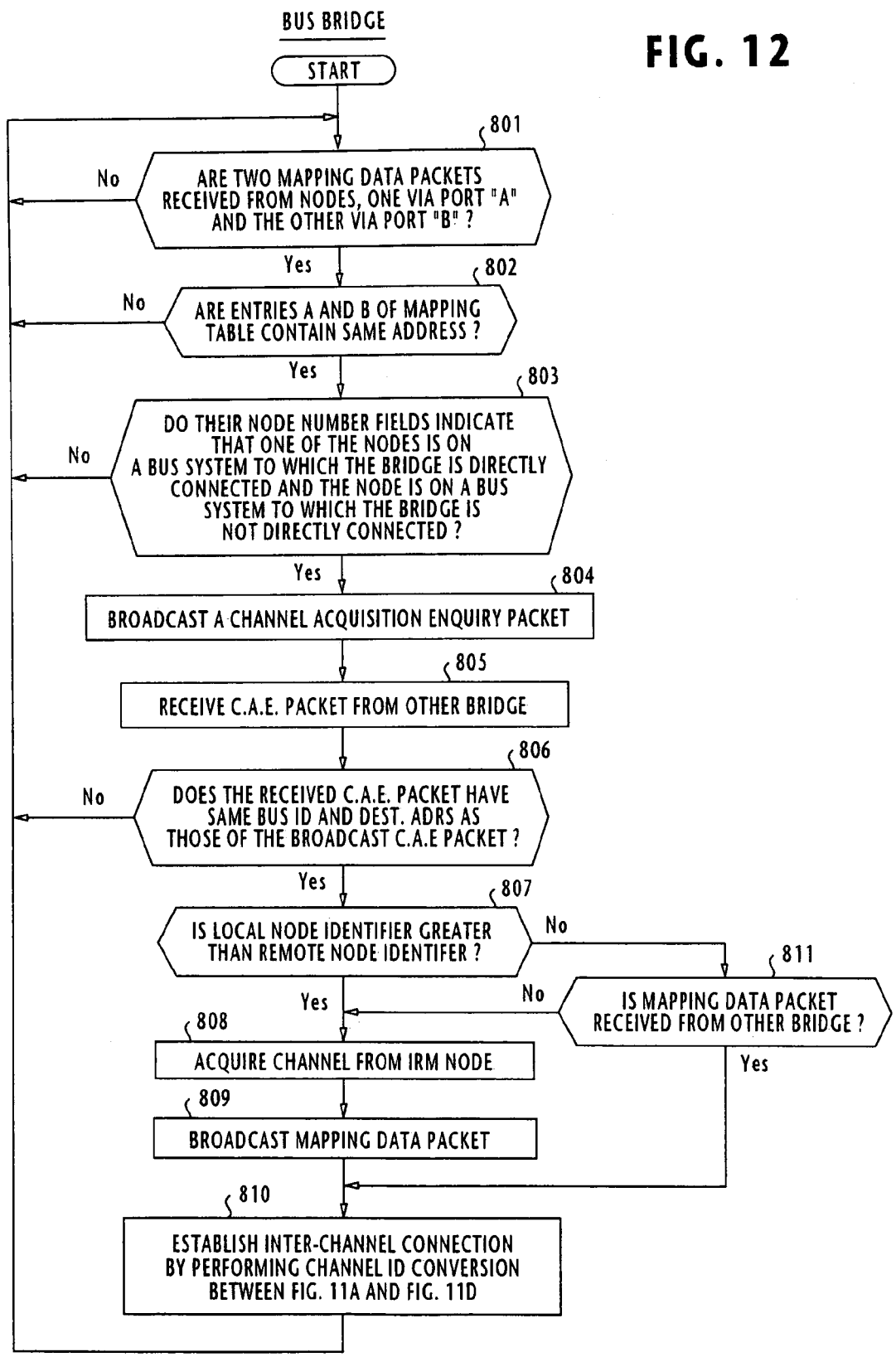
FIG. 12 is a flowchart of the operation of each of the bridges according to the second embodiment of the present invention when inter-channel connection is established.

Referring now to FIG. 1, a multiple bus network of the present invention is shown comprising bus systems 109, 110 and 111 interconnected by bus bridges 107 and 108. Each bus bridge has two ports respectively designated A and B. Each of these ports has an IEEE-1394 compliant data link layer for interfacing the IEEE-1394 serial bus of its neighboring bus system. Nodes 101 and 102 are serially interconnected by the bus 109 which is connected at one end to the port A of bridge 107. Nodes 103 and 104 are serially interconnected by the bus 110 which are connected at one end to the port B of bridge 107 and at the other end to the port A of bridge 108. Finally, nodes 105 and 106 are serially connected by the bus 111 that is connected at one end to the port B of bridge 108. All bus systems are IEEE-1394 serial bus systems and all nodes are also IEEE-1394 compliant devices. For each bus system, there is one node that operates as an Isochronous Resource Manager (IRM). In the illustrated network, nodes 102, 104 and 106 are the IRM node. Each node of the network is composed of a line interface for interfacing the node to the associated bus, a packet assembler/disassembler, timer circuitry, a memory and a control unit that provides overall control of the node components.

As shown in FIG. 3, each bus bridge includes a packet switching unit 210 connected between its ports A and B, a packet assembler/analyzer 211 for assembling a transmit packet and analyzing a received packet, timer circuitry 212 for providing a timing action, and a memory 213 for creating a mapping table according to received packets announcing information pertaining to channel and multicast address and so on. A control unit 214 for overall control of the bridge components. When the control unit 214 of each bus bridge receives two messages, one from the port A and the other from the port B, it causes the packet assembler/analyzer 211 to determine whether they contain the same multicast address and different channel identifiers from each other. If so, the control unit sets the packet switching unit 210 so that it establishes a connection between two channels acquired respectively for the bus systems to which the ports A and B are directly connected. Specifically, when a multicast packet is received at the port A, the packet switching unit 210 translates the channel identifier contained in the header of the multicast packet to a channel identifier used in the bus system that is connected to the port B and forwards the header-translated multicast packet to the port B.

Each node of the multiple bus network operates in compliance with TCP/IP and IP over IEEE 1394 protocol (RFC 2734) to transfer IP packets within its own bus system. Each bus bridge has the ability to retransmit unicast packets and broadcast packets between neighboring bus systems.

Each node of the network is assigned an IP address "A1" which is used as a member address of a multicast group in which the node desires to participate. User datagram protocol (UDP) will be used to transmit multicast packets. A multicast group is therefore identified by the IP address A1 and the user datagram protocol.

Control messages used by the nodes and bus bridges include a number of control data fields as shown in FIG. 2. These include a node number field 201, a message type field 202, a channel number field 203, and a destination address field 204. The node number field 201 contains a node identifier which consists of a bus identifier of the attached bus system and a node identifier of the node in that bus system. Thus, node 101, for example, is assigned a node number which is a sum of the identifiers of bus system 109 and node 101. The message type field 202 contains four message types including "channel acquisition enquiry", "report from transmit node", "report from receive node" and "channel transfer enquiry". The channel acquisition enquiry message is used by a node when it determines whether a channel for multicast transmission has been acquired. The "report from transmit node" message is used by both transmit-only nodes and transmit/receive nodes. This message contains mapping data indicating the relationship between a multicast group address and an assigned channel number The "report from receive node" message is used by receive-only nodes and the bus bridges. This message contains mapping data indicating a relationship between a multicast group address and a channel number. The channel number contained in both types of report message is stored in a channel management database. The channel transfer enquiry message is used by a node which has gained ownership of a channel for multicast transmission when it makes a search through the network for a node to hand over the channel ownership at the end of the transmission.

A channel number set in the channel number field 203 ranges from "0" to "63" except for the number "31". The destination address field 204 contains an IP address selected from the range between "224. 0. 0.1" to "239. 255. 255. 255".

The following is a description of the transaction sequence of the multiple bus system between bus systems 109 and 110 with the aid of a sequence diagram shown in FIG. 4 when nodes 101 and 103 are requesting a channel for multicast transmission to a multicast group. For purposes of explanation, the node 101 is the first to send a channel acquisition enquiry packet.

As shown in FIG. 5A, the node 101 formulates a channel acquisition. enquiry packet by setting its node identifier plus the identifier of the bus 109 in the node number field 201 of the packet, setting a "channel acquisition enquiry" message in the message type field 202, and an IP address "A1" as a multicast group address in the destination address field 204. Specifically, the multicast group address A1 is specified by a TCP/IP compliant application program installed on the node 101, Then, the node 101 broadcasts this channel acquisition enquiry packet to the network and waits for a reply from the network to determine whether a channel has been acquired for the multicast group (procedure 301). As illustrated, the packet propagates through the network, passing through all intermediate nodes and bus bridges, and reaches the node 106 at the far end of the network.

If no reply is returned from the network, the node 101 sends a channel request packet to the IRM node 102 to acquire a channel "C1" for multicast transmission (procedure 302).

As shown in FIG. 5B, the node 101 formulates a mapping data packet by setting its node number field 201 with the same information as the channel acquisition enquiry packet, the message type field 202 with the "report from transmit node" message, the channel number field 203 with C1, and the destination address field 204 with A1. Node 101 broadcasts this mapping data packet to the network at periodic intervals (procedure 303).

Bus bridges 107 and 108 each receive the mapping data packet through their port A and map the contents of the mapping data packet to the port A in their mapping tables shown in FIG. 5C (procedure 304).

Node 101 then starts multicasting asynchronous stream packets over the assigned channel C1 (procedure 305). Although these multicast packets are received and retransmission by the node 102 to the bus bridge 107, they are not repeated by the bus bridge 107, as illustrated in FIG. 4.

When the node 103 wishes to send packets to a multicast group during the time the node 101 continues its multicast transmissions, the node 103 broadcasts a channel acquisition enquiry packet to determine if a channel has been acquired for the multicast group (procedure 306). If the multicast group of node 103 has the same multicast address A1, the channel acquisition enquiry packet contains the same information as those of the channel acquisition enquiry packet used by the node 101 except that its node number field 201 contains the identifiers of bus 110 and node 103, as shown in FIG. 5A. Although the node 101 has acquired a channel for the multicast group of address A1, it does not respond to the channel acquisition enquiry packet from the node 103. Therefore, if no reply is returned from within the same bus system, the node 103 sends a channel request packet to the IRM node 104 to acquire an asynchronous channel C2 for multicast transmission (procedure 307).

As shown in FIG. 5B, the node 103 formulates a mapping data packet by setting its node number field 201 with the same information as the channel acquisition enquiry packet, the message type field 202 with the "report from transmit node" message, the channel number field 203 with C2, and the destination address field 204 with A1. Node 103 broadcasts this mapping data packet to the network at periodic intervals (procedure 308).

Bus bridge 107 receives the mapping data packet from the node 103 through its port B and updates its own mapping table (FIG. 5C) by storing the contents of the received packet in the port B, whereas the bus bridge 108 receives this packet through its port A and updates its own mapping table of FIG. 5D by storing the contents of the received packet in the port A (procedure 309).

Referring to the flowchart of FIG. 8, each of the bus bridges 107 and 108 is monitoring the bus systems to determine if they have received two mapping data packets, one through their port A and the other through their port B (step 401). This is achieved by the bus bridge 107 by making a comparison between the mapping table of FIG. 5C and that of FIG. 6C and is achieved in the bus bridge 108 by making a comparison between the mapping table of FIG. 5C and that of FIG. 6D. Since the decision at step 401 is affirmative only in the bus bridge 107, the bridge 108 returns to the starting point of the routine, while the bridge 107 proceeds to step 402 to determine whether the mapping data packets have the same multicast address. If this is the case, the bus bridge 107 makes a further test on their node number fields to determine whether they indicate that the packets have been received from the bus systems to which the ports of bridge 107 are directly connected (step 403). If so, the bridge 107 proceeds to step 404 to examine the message type fields in the port-A and port-B entries of mapping table (FIG. 5C) to determine if they contain a "report from receive node" message. Since the message type fields of both entries contain a "report from transmit node" message, the decision at step 404 is negative and the bridge 107 advances to step 405 to establish a connection between the channels respectively acquired by the nodes 101 and 103 through the ports A and B.

Since the "report from receive node" message indicates that there is no sender at all, no packets exist for multicast transmission. Therefore, if such a message is contained in at least one of these mapping tables, the bus bridge returns from step 404 to the starting point of the routine.

Returning to FIG. 4, the establishment of the connection between the ports A and B of bus bridge 107 is indicated by procedure 310. More specifically, the bus bridge 107 establishes the connection by converting the channel number C1 of asynchronous stream packets received through its port A to the channel number C2 of the mapping table of FIG. 5C when forwarding the received packets to its port B and converting the channel number C2 of asynchronous stream packets received through its port B to the channel number C1 of the mapping table of FIG. 5C when forwarding the received packets to its port A.

Following the transmission of the mapping data packet (procedure 408), the node 103 proceeds to start transmitting asynchronous stream packets (procedure 311). These multicast packets are retransmitted by bridge 107 to the nodes on the bus system 109 by performing the channel number conversion process described above. Likewise, the multicast packets which are subsequently transmitted from the node 101 are repeated through the bridge 107 to the bus system 110 (procedure 312).

In FIG. 8, when the node 101 ceases its multicast transmission (procedure 501), it formulates a channel transfer enquiry packet by setting its message type field with a channel transfer message and setting the other fields with the same information as those of the mapping data packet of FIG. 5B. Node 101 broadcasts this transfer enquiry packet through the network (procedure 502) and starts a timer for setting a later time instant for transmission of a channel transfer request to the IRM node 102.

Upon receipt of the transfer enquiry packet at procedure 502, the bus bridge 107 performs a routine as shown in FIG. 9.

In FIG. 9, the bridge 107 determines whether the bus identifier contained in the node number field of the packet indicates that the packet has been received from the bus system to which the bridge 107 is directly connected (step 602). If so, the bridge 107 stores the information contained in the node number field 201, the channel number C1 and the multicast address A1 of the packet in memory (step 603) and starts a timer (step 604). At step 605, the bus bridge 107 analyzes the contents of the received packet and determines if the bus identifier and multicast address of the packet match the stored bus identifier and multicast address and if the packet's message type field contains a "report from transmit node" or a "report from receive node". If the decision is affirmative, flow returns to the starting point of the routine. Otherwise, the bridge 107 proceeds to step 605 to determine whether the timer has run out of a predetermined timeout period "Ta" (step 605). If the timer is still running (step 606), step 605 is repeatedly executed. If step 605 yields affirmative decision in the repeated execution, the bus bridge 107 clears the inter-channel connection, and returns to the starting point of the routine (step 607).

In the sequence diagram of FIG. 8, the clear-down of the connection between the bus systems 109 and 110 occurs when the timeout period "Ta" has elapsed (procedure 503).

On the other hand, the node 101 started its own timer (procedure 502). This timer is set to expire when timeout period "Td" greater than "Ta" has elapsed. Therefore, this timer expires after the bus bridge 107 cleared the inter-bus connection. In response to the running out of its own timer, the node 101 sends a channel transfer request packet to the IRM node 102 to restore the ownership of the acquired channel (procedure 504). The reason for the earlier occurrence of the channel clear-down by bridge 107 than the restoration of channel ownership by node 101 is to ensure against possible delivery of packets from the bus system 110 to wrong destinations on the bus 109.

In a second embodiment of the present invention, the bus bridges 107 and 108 operate to establish inter-channel connections between the terminal bus systems 109 and 111 via the intermediate bus system 110.

The description of the operation of the second embodiment proceeds with the aid of a sequence diagram of FIG. 10 by assuming that the nodes 101 and 105 are the transmit nodes of multicast transmission to the same address A1 and that the node 101 is the first to initiate channel acquisition.

Since the node 101 is the first to initiate channel acquisition, procedures 301 through 305 of FIG. 4 are repeated in the sequence diagram of FIG. 10.

Thus, the bus bridges 107 and 108 store the contents of mapping data packet broadcast from node 101 in the port-A entry of a mapping table as shown in FIG. 11A (procedure 304) and the node 101 acquires the channel C1 from the IRM node 102 for multicast transmission (procedure 305).

Node 105 then broadcasts a channel acquisition enquiry packet for multicast transmission (procedure 701), acquires a channel C3 from the IRM node 106 (procedure 702), and broadcasts a mapping data packet (procedure 703). As a result, the bus bridges 107 and 108 store the contents of mapping data packet broadcast from the node 105 in the port-B entry of the mapping table of FIG. 11A (procedure 704).

Bus bridges 107 and 108 then attempt to establish a connection between the bus systems 109 and 111 by initially sending channel acquisition enquiry packets in sequence (procedure 705, 706), mutually examining the contents of their packets to determine the bridge to acquire a channel from the IRM node (procedure 707), and broadcasting a mapping data packet from that bridge (procedure 708) and finally establishing inter-channel connections (procedure 709).

In FIG. 12 where details of procedures 705 through 709 are illustrated, each of the bus bridges monitors the mapping table of FIG. 11A for detecting when two mapping data packets are received from nodes on different bus systems, one through the port A and the other through the port B (step 801) and yields an affirmative decision. At step 802, each bus bridge determines whether the both entries contain the same multicast destination A1. If so, flow proceeds to step 803 to check to see if the node number fields of the mapping table indicate that one of the nodes is on a bus system to which the bridge is directly connected and the other node is on a bus system to which the bridge is not directly connected.

If this is the case, each bus bridge proceeds to step 804 to broadcast a channel acquisition enquiry packet and receives a channel acquisition enquiry packet sent from another bridge (step 805). The details of the channel acquisition enquiry packets sent from bridges 107 and 108 are shown in FIGS. 10B and 10C, respectively.

At step 806, each bus bridge compares the contents of its own broadcast channel acquisition enquiry packet with those of the received C.A.E. packet and determines whether they have the same bus identifier and multicast address. If the decision at step 806 is affirmative, flow proceeds to step 807 to check to see if the local node (bridge) identifier is greater than the node identifier of the remote bridge. If so, the local bridge acquires a channel (C2) from the IRM node (step 808) and broadcasts a mapping data packet (step 809).

Therefore, if the node identifier of bridge 107 is greater than that of bridge 108, the bridge 107 is given higher priority to acquire a channel from the IRM node 104, as indicated by procedure 707 in FIG. 10, and broadcasts a mapping data packet. Details of this packet are shown in FIG. 11D.

The bridge to which higher priority is assigned establishes an inter-channel connection (step 810) by converting the channel identifier given in the mapping table of FIG. 11A to the channel identifier contained in the mapping data packet of FIG. 11D.

Conversely, if the node identifier of the local bridge is not greater than that of the remote bridge, the local bridge is given lower priority and proceeds from step 807 to step 811 to check to see if a mapping data packet is received from the remote bridge within a specified time interval. If the decision at step 811 is affirmative, flow proceeds to step 810 to establish an inter-channel connection. If no mapping data packet is received, the decision at step 811 is negative and the bridge of the lower priority proceeds to step 808 to acquire a channel C2 from the IRM node 104 and broadcasts a mapping data packet (step 809). The priority can be alternatively determined by having the bridges 107 and 108 select a random number. The bridge that selected a greater value of random number is given the higher priority.

With the inter-channel connections being established at bridges 107 and 108, the nodes 101 and 105 transmit their multicast packets to the network (procedures 710, 711).

A procedure for restoring the ownership of channels C1 and C2 respectively acquired by the node 101 and the bridge 107 is illustrated in FIG. 13.

In FIG. 13, when the node 101 ceases its multicast transmission (procedure 901), it broadcast a channel transfer enquiry packet through the network (procedure 902) and starts a timer that is set expire at the end of a period Td for later transmission of a channel transfer request to the IRM node 102. In response to this transfer enquiry packet, the bus bridge 107 performs the routine of FIG. 9 to clear down the inter-channel connection between the bus systems 109 and 110 when the timer expires at the end of the period Ta (procedure 903). Bus bridge 107 broadcasts a channel transfer enquiry packet (procedure 904). Bridge 108 stores this packet (procedure 905) and performs the routine of FIG. 9 to clear down the inter-channel connection at the end of a timeout period Tc (procedure 906). At the end of a timeout period Td from the instant the transfer enquiry packet is broadcast, the node 101 informs the IRM node 102 of the restoration of the channel C1 (procedure 907). Likewise, the bridge 107 communicates the restoration of the channel C2 to the IRM node 104 at the end of a timeout period "Te" from the instant it performed the broadcasting of the transfer enquiry packet (procedure 908).

FIG. 14 illustrates a further feature of the present invention in which inter-bus multicast transmission is implemented between two neighboring bus systems, one having at least one transmit node and the other only one receive-only node. In the illustrated embodiment, the node 101 on bus 109 is the transmit node and the node 103 on bus 110 is the receive-only node.

The operation of the network starts with the node 101 broadcasting a channel acquisition enquiry packet (FIG. 5A) as in the previous embodiments. Therefore, the network responds to this packet by performing procedures 301 through 305 in the same manner as described above. Thus, the node 101 is broadcasting a mapping data packet of FIG. 5B at periodic intervals for announcing the information necessary for the receive node 103 to acquire a channel.

As indicated by procedure 1001 in the sequence diagram of FIG. 14, the node 103 is activated as a receive node to participate in the multicast group of bus system 109 and waits for a periodic broadcast of mapping data from the node 101. When the mapping data packet is broadcast (procedure 1002), the bus, bridges 107 and 108 create a mapping table (see FIG. 15A) (procedure 1003). Simultaneously, the receive node 103 creates the same mapping table in its own memory (procedure 1004). Node 103 then broadcasts a channel acquisition enquiry packet of FIG. 5A for a response from the bus 110 (procedure 1005), Since no channel is acquired for the bus system 110, the node 103 receives no response, and hence it acquires a channel C2 from the IRM node 104 (procedure 1006). At periodic intervals, the receive node 103 broadcasts a mapping data packet which is similar to the packet of FIG. 5 except that its message type field contains a "report from receive node" message, instead of the "report from transmit node" message (procedure 1007).

Upon receipt of the mapping data packet (procedure 1007), the bridge 107 stores the contents of the received packet into the port-B entry of the mapping table as shown in FIG. 15B and the bridge 108 stores them into the port-A entry of the mapping table as shown in FIG. 15C. both of the bridges 107, 108 then perform the routine of FIG. 7. Since the bus bridge 107 received mapping data packets through its ports A and B, the decision at step 801 is affirmative. Bridge 107 successively performs steps 802 and 803. Decisions at both of these steps are affirmative, the bridge 107 proceeds to step 804. Since the port-A entry of mapping table (FIG. 15B) contains a "report from transmit node" message, the decision at step 804 is negative, the channel C1 on the bus system 109 and the channel C2 on the bus system 110 are interconnected by the bridge 107 at step 805.

In the sequence diagram of FIG. 14, the establishment of the inter-channel connection is indicated by numeral 1008.

Multicast transmission from the transmit node 101 to the bus system 110 (procedure 1009). Node 103 is now able to receive multicast packets from the transmit node 101.

FIG. 16 illustrates a sequence in which the transmit node 101 and receive node 103 restore the acquired channels to their IRM node. When the transmit node 101 ceases its multicast transmission (procedure 1101), it broadcasts a channel transfer enquiry packet and starts a timer with period Td (procedure 1102). Bridge 107 receives this transfer enquiry packet and stores its contents in memory and starts its timer with timeout period Ta. Node 103 also receives this packet and stores its contents in memory and starts a timer with a timeout period Th and starts monitoring the channel for detecting a packet from a node wishing to take over the ownership of the acquired channel C1 (procedure 1103). This packet contains the identifier of bus 109, a "report from transmit node" message and address A1. Bridge 107 now performs the clear-down routine of FIG. 9, so that the connection between the channels C1 and C2 is cleared at the end of timeout period Ta (procedure 1104). Transmit node 101 restores the channel C1 to the IRM node 102 at the end of timeout period Td of its own timer (procedure 1105). At the end of timeout period Tb (where Tb>Ta), the node 103 terminates the channel monitoring (procedure 1106).

Receive-only node 103 broadcasts a channel transfer enquiry packet and activates a timer with a timeout period Tc (procedure 1107). During this period, the node 103 monitors the channel for detecting a channel takeover packet from a node containing the identifier of bus 110, either a "report from transmit node" or "report from receive node" message and address A1. If the node 103 fails to detect such a channel takeover packet within the set period Tc, it returns the ownership of the channel C2 to the IRM node 104 (procedure 1108).

What is claimed is:

1. A packet communication method for a network having a plurality of bus systems interconnected by at least one bus bridge, wherein at least one node is attached to each of said bus systems, wherein said bus systems, said bridge and said node are in compliance to a serial bus standard, the method comprising the steps of:

establishing a mapping table in a memory of the at least one bus bridge, the mapping table mapping multicast addresses and channels assigned for multicast transmission in the respective bus systems;

in a packet switching unit in the at least one bus bridge, translating a channel identifier for a multicast packet for one of the bus systems to a channel identifier for the multicast packet for another of the bus systems based on the mapping table; and the at least one bus bridge establishing a connection between a first channel used in a first bus system of said plurality of bus systems for transmission of packets to a first multicast address and a second channel used in a second bus system of said plurality of bus systems for transmission of packets to a second multicast address if said first and second multicast addresses are equal to each other.

2. A packet communication method for a network having a plurality of bus systems interconnected by at least one bus bridge, wherein at least one node is attached to each of said bus systems, wherein said bus systems, said bridge and said node are in compliance to a serial bus standard, the method comprising the steps of:

establishing a mapping table in a memory of the at least one bus bridge, the mapping table mapping multicast addresses and channels assigned for multicast transmission in the respective bus systems;

in a packet switching unit in the at least one bus bridge, translating a channel identifier for a multicast packet for one of the bus systems to a channel identifier for the multicast packet for another of the bus systems based on the mapping table; and said at least one node attached to each of said plurality of bus systems, when initiating a multicast packet transmission to a multicast group of the bus systems, acquiring a channel to be used for said multicast packet transmission and broadcasts a message pertaining to said channel; and said at least one bus bridge establishing a connection between channels acquired for different bus systems when said message is received from each of said different bus systems.

3. A packet communication method for a network having an intermediate bus system connected between first and second bus systems by first and second bus bridges, wherein at least one node is attached to each of said bus systems, and wherein said bus systems, said bridge and said node are in compliance to a serial bus standard, characterized in that:

said at least one node attached to each of said bus systems acquires a channel to be used for multicast packet transmission and broadcasts a message pertaining to said channel and a multicast group when initiating a multicast packet transmission to said multicast group;

said first bus bridge acquires an interconnection channel if there is no node in said intermediate bus system participating in said multicast group and if two of said message having an identical multicast address are received, one from said first bus system and the other from said second bus system, broadcasts a message pertaining to said interconnection channel and said multicast group and connects a first end of the interconnection channel to the channel acquired for said first bus system; and said second bus bridge connects a second end of the interconnection channel to the channel acquired for the second bus system when said message is received from said first bus bridge.

4. The packet communication method of claim 3, wherein said first bus bridge is determined as a bridge responsible for acquisition of said interconnection channel depending on relative values of identifiers assigned to said first and second bus bridges.

5. The packet communication method of claim 3, wherein said first bus bridge is determined as a bridge responsible for acquisition of said interconnection channel depending on a random number.

6. A packet communication method for a network having a plurality of bus systems interconnected by at least one bus bridge, wherein at least one node is attached to each of said bus systems, and wherein said bus systems, said bridge and said node are in compliance to a serial bus standard, characterized in that:

said at least one node attached to each of said plurality of bus systems acquires a first channel to be used for multicast packet transmission and broadcasts a first message containing information pertaining to said first channel and a multicast group when initiating a multicast packet transmission to said multicast group;

said at least one node on each of said bus systems when operating as a receive-only node acquires a second channel if said first message is received when the bus system of the receive-only node has no node responsible for channel acquisition, and broadcasts a second message pertaining to said second channel and said multicast group; and said at least one bus bridge establishes an inter-channel connection between said first and second channels when said first and second messages are received.

7. A packet communication method for a network comprising a plurality of nodes, first and second bus systems to which said nodes are attached, and a bus bridge for performing a transfer of packets between said first and second bus systems, the method comprising the steps of:

a) acquiring, at a first node attached to said first bus system, a first channel for transmission of packets to a first multicast address and broadcasting a first message pertaining to said first channel and said first multicast address;

b) acquiring, at a second node attached to the second bus system, a second channel for transmission of packets to a second multicast address and broadcasting a second message pertaining to said second channel and said second multicast address; and c) receiving, at said bus bridge, the first and second messages and establishing a connection between two channels respectively identified by the received messages if the multicast addresses contained therein are equal to each other.

8. The packet communication method of claim 7, wherein the step (c) comprises establishing said connection by converting a channel identifier contained in a multicast packet received on said first channel to a channel identifier identifying said second channel and converting a channel identifier contained in a multicast packet received on said second channel to a channel identifier identifying said first channel.

9. The packet communication method of claim 7, wherein said first and second messages further contain first and second bus identifiers respectively identifying said first and second bus systems, and wherein said bus bridge has first and second ports respectively connected to said first and second bus systems, and wherein the step (c) comprises establishing said connection if the bus bridge receives said first message through said first port and said second message through said second port and if said first and second bus identifiers respectively contained in said first and second messages indicate that said bus bridge is directly connected to said adjacent bus systems.

10. A packet communication method for a network comprising first and second bus systems and an intermediate bus system between said first and second bus systems, a plurality of nodes attached to said first, second and intermediate bus systems, and a first bus bridge for performing a transfer of packets between said first and intermediate bus systems, and a second bus bridge for performing a transfer of packets between said intermediate and second bus systems, the method comprising the steps of:
  a) acquiring, at a first node attached to said first bus system, a first channel for transmission of packets to a first multicast address and broadcasting a first message pertaining to said first channel and said first multicast address;
  b) acquiring, at a second node attached to said second bus system, a second channel for transmission of packets to a second multicast address and broadcasting a second message pertaining to said second channel and said second multicast address;
  c) receiving, at said first bus bridge, the first and second messages and acquiring a third channel for transfer of packets on said intermediate bus system if the received first and second messages indicate that the multicast addresses contained therein are equal to each other, establishing a connection between a channel identified by the received first message and the acquired third channel, and broadcasting from said first bus bridge a third message pertaining to said third channel;
  d) receiving, at said second bus bridge, the first and second messages from said first and second nodes and subsequently receiving said third message from said first bus bridge if the received first and second messages indicate that the multicast addresses contained therein are equal to each other, and establishing a connection between two channels respectively identified by the second and third messages.

11. The packet communication method of claim 10, wherein the step (c) comprises:
  establishing said connection, at said first bus bridge, by converting a channel identifier contained in a multicast packet received on said first channel to a channel identifier identifying said third channel and converting a channel identifier contained in a multicast packet received on said third channel to a channel identifier identifying said first channel, and
  establishing said connection, at said second bus bridge, by converting a channel identifier contained in a multicast packet received on said second channel to a channel identifier identifying said third channel and converting a channel identifier contained in a multicast packet received on said third channel to a channel identifier identifying said second channel.

12. The packet communication method of claim 10, wherein said first and second messages further contain first and second bus identifiers respectively identifying said first and second bus systems, and wherein said first bus bridge has first and second ports respectively connected to said first and intermediate bus systems, and said second bus bridge has first and second ports respectively connected to said intermediate and second bus systems, wherein the step (c) comprises:
  establishing said connection, at said first bus bridge, if the first bus bridge receives said first message through said first port and said second message through second port and if said first and second bus identifiers respectively contained in said first and second messages indicate that the first bus bridge is directly connected to said first bus system, and
  establishing said connection, at said second bus bridge, if the second bus bridge receives said first message through said first port and said second message through said second port and if said first and second bus identifiers respectively contained in said first and second messages indicate that the second bus bridge is directly connected to said second bus system.

13. The packet communication method of claim 10, wherein said first bus bridge is determined as a bridge responsible for acquisition of said third channel depending on relative values of identifiers assigned to said first and second bus bridges.

14. The packet communication method of claim 10, wherein said first bus bridge is determined as a bridge responsible for acquisition of said third channel depending on a random number.

15. A packet communication method for a network comprising a plurality of nodes, first and second bus systems to which said nodes are attached, and a bus bridge for performing a transfer of packets between adjacent said first and second bus systems, the method comprising the steps of:
  a) acquiring, at a first node attached to said first bus system, a first channel for transmission of packets to a multicast address and broadcasting a first message pertaining to said first channel and said multicast address;
  b) acquiring, at a second, receive-only node attached to said second bus system, a second channel for reception of packets from the first node in response to receipt of said first message and broadcasting a second message pertaining to said second channel and said multicast address;
  c) receiving, at said bus bridge, the first and second messages and establishing a connection between two channels respectively identified by the received first and second messages if multicast addresses contained therein are equal to each other.

16. A bus bridge to interconnect a plurality of bus systems of a packet communication network, each of said bus systems including at least one node, wherein said bus systems, said bridge and said node are in compliance to a serial bus standard, wherein said bus bridge establishes a connection between a first channel used in a first bus system of said plurality of bus systems for transmission of packets to a first multicast address and a second channel used in a second bus system of said plurality of bus systems for transmission of packets to a second multicast address if said first and second multicast addresses are equal to each other and said first and second channels have different channel identifiers from each other , wherein
  said bus bridge includes a memory with a mapping table that maps the multicast addresses and the channels assigned for multicast transmission in the respective bus systems, and a packet switching unit that translates a channel identifier for a multicast packet for one of the bus systems to a channel identifier for the multicast packet for another of the bus systems based on the mapping table.

17. A packet communication network comprising a plurality of bus systems interconnected by at least one bus bridge, wherein at least one node is attached to each of said bus systems, and wherein said bus systems, said bridge and said node are in compliance to a serial bus standard, wherein, said at least one bus bridge includes a memory with a mapping table that maps a multicast group address and channels assigned for multicast transmission in the respective bus systems, and a packet switching unit that translates a channel identifier for a multicast packet for one of the bus systems to a channel identifier for the multicast packet for another of the bus systems based on the mapping table;

said at least one node attached to each of said plurality of bus systems, when initiating a multicast packet transmission to a multicast group of the bus systems, acquires a channel to be used for said multicast packet transmission and broadcasts a message containing information pertaining to said channel; and said at least one bus bridge establishes a connection between channels acquired for different bus systems when said message is received from each of said different bus systems.

18. A packet communication network comprising an intermediate bus system connected between first and second bus systems by first and second bus bridges, wherein at least one node is attached to each of said bus systems, and wherein said bus systems, said bridge and said node are in compliance to a serial bus standard, characterized in that:

said at least one node attached to each of said bus systems is responsible for acquisition of a channel to be used for multicast packet transmission and broadcasts a message containing information pertaining to said channel and a multicast group when initiating a multicast packet transmission to said multicast group;

said first bus bridge acquires an interconnection channel if there is no node in said intermediate bus system participating in said multicast group and if two of said message having an identical multicast address are received, one from said first bus system and the other from said second bus system, broadcasts a message pertaining to said interconnection channel and said multicast group and connects a first end of the interconnection channel to the channel acquired for said first bus system; and said second bus bridge connects a second end of the interconnection channel to the channel acquired for the second bus system when said message is received from said first bus bridge.

19. A packet communication network comprising a plurality of bus systems interconnected by at least one bus bridge, wherein at least one node is attached to each of said bus systems, and wherein said bus systems, said bridge and said node are in compliance to a serial bus standard, characterized in that:

said at least one node attached to each of said plurality of bus systems acquires a first channel to be used for multicast packet transmission and broadcasts a first message containing information pertaining to said first channel and a multicast group when initiating a multicast packet transmission to said multicast group;

said at least one node on each of said bus systems when operating as a receive-only node acquires a second channel if said first message is received when the bus system of the receive-only node has no node responsible for channel acquisition, and broadcasts a second message pertaining to said second channel and said multicast group; and said at least one bus bridge establishes an inter-channel connection between said first and second channels when said first and second messages are received.

20. A packet communication network comprising:
a plurality of nodes;
first and second bus systems to which said nodes are attached; and
a bus bridge for performing a transfer of packets between said first and second bus systems;
a first node attached to said first bus system acquiring a first channel for transmission of packets to a first multicast address and broadcasting a first message pertaining to said first channel and said first multicast address;
a second node attached to the second bus system acquiring a second channel for transmission of packets to a second multicast address and broadcasting a second message pertaining to said second channel and said second multicast address,
said bus bridge receiving the first and second messages and establishing a connection between two channels respectively identified by the received messages if the multicast addresses contained therein are equal to each other.

21. The packet communication network of claim 20, wherein said bus bridge establishes said connection by converting a channel identifier contained in a multicast packet received on said first channel to a channel identifier identifying said second channel and converting a channel identifier contained in a multicast packet received on said second channel to a channel identifier identifying said first channel.

22. The packet communication network of claim 20, wherein said first and second messages further contain first and second bus identifiers respectively identifying said first and second bus systems, and wherein said bus bridge has first and second ports respectively connected to said first and second bus systems and establishes said connection if the bus bridge receives said first message through said first port and said second message through said second port, and if said first and second bus identifiers respectively contained in said first and second messages indicate that said bus bridge is directly connected to said first and second bus systems.

23. A packet communication network comprising:
first and second bus systems and an intermediate bus system between said first and second bus systems;
a plurality of nodes attached to said first, second and intermediate bus systems;
a first bus bridge for performing a transfer of packets between said first and intermediate bus systems;
a second bus bridge for performing a transfer of packets between said intermediate and second bus systems;
a first node attached to said first bus system acquiring a first channel for transmission of packets to a first multicast address and broadcasting a first message pertaining to said first channel and said first multicast address,
a second node attached to said second bus system acquiring a second channel for transmission of packets to a second multicast address and broadcasting a second message pertaining to said second channel and said second multicast address,
said first bus bridge receiving the first and second messages, acquiring a third channel for transfer of packets on said intermediate bus system if the received messages indicate that the multicast addresses contained therein are equal to each other, establishing a connection between a channel identified by the received first message and the acquired third channel, and broadcasting a third message pertaining to said third channel, said second bus bridge receiving the first and second messages, and subsequently receiving said third message if the received first and second messages indicate that the multicast addresses contained therein are equal to each other, and establishing a connection between two channels respectively identified by the second and third messages.

24. The packet communication network of claim 23, wherein said first bus bridge establishes said connection by converting a channel identifier contained in a multicast packet received on said first channel to a channel identifier identifying said third channel and converting a channel identifier contained in a multicast packet received on said third channel to a channel identifier identifying said first channel, and wherein said second bus bridge establishes said connection by converting a channel identifier contained in a multicast packet received on said second channel to a channel identifier identifying said third channel and converting a channel identifier contained in a multicast packet received on said third channel to a channel identifier identifying said second channel.

25. The packet communication network of claim 23, wherein said first and second messages further contain first and second bus identifiers respectively identifying said first and second bus systems, and wherein said first bus bridge has first and second ports respectively connected to said first and intermediate bus systems, and said second bus bridge has first and second ports respectively connected to said intermediate and second bus systems, wherein each of said first and second bus bridges establishes said connection if the bus bridge receives said first message through said first port and said second message through said second port, and if said first and second bus identifiers respectively contained in said first and second messages indicate that the first and second bus bridges are directly connected to said first and second bus systems, respectively.

26. The packet communication network of claim 23, wherein said first bus bridge is determined as a bridge responsible for acquisition of said third channel depending on relative values of identifiers assigned to said first and second bus bridges.

27. The packet communication network of claim 23, wherein said first bus bridge is determined as a bridge responsible for acquisition of said third channel depending on a random number.

28. A packet communication network comprising:

a plurality of nodes;

first and second bus systems to which said nodes are attached; and a bus bridge for performing a transfer of packets between adjacent said first and second bus systems, a first node attached to said first bus system acquiring a first channel for transmission of packets to a multicast address and broadcasting a first message pertaining to said first channel and said multicast address, a second, receive-only node attached to said second bus system acquiring a second channel for reception of packets from the first node in response to receipt of said first message and broadcasting a second message pertaining to said second channel and said multicast address, said bus bridge receiving the first and second messages and establishing a connection between two channels respectively identified by the received first and second messages if multicast addresses contained therein are equal to each other.

* * * * *